Dec. 31, 1929.  W. R. McGOWEN  1,741,162
SHOCK ABSORBING DEVICE
Filed Sept. 22, 1926
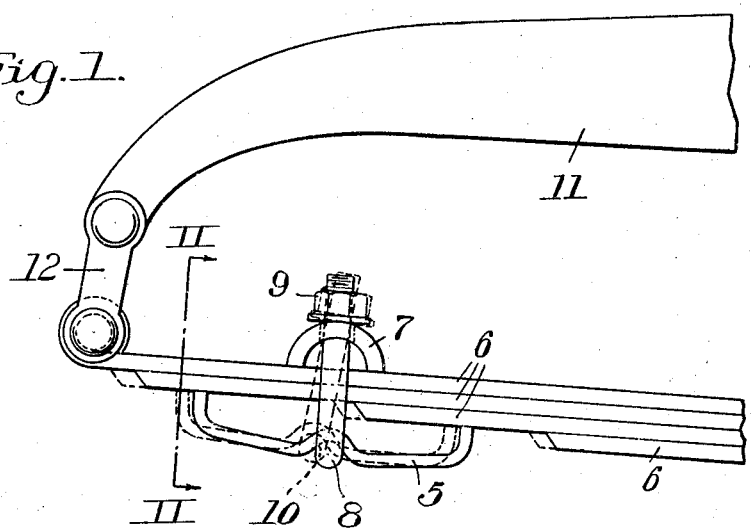
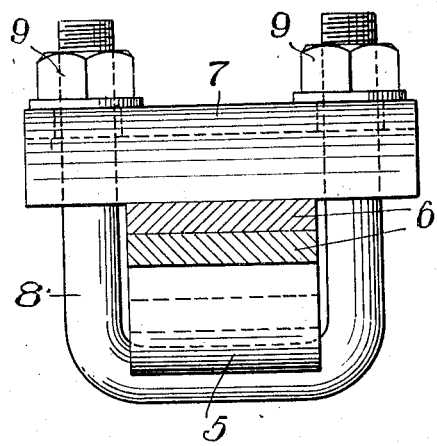
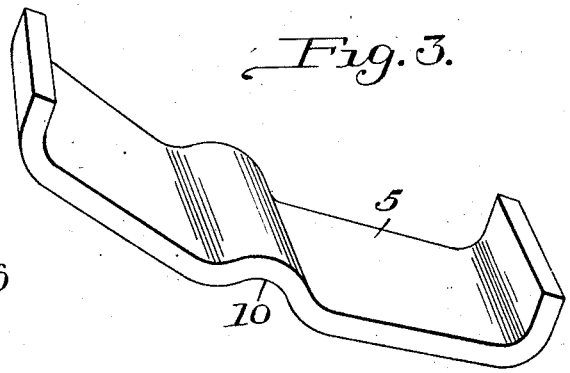
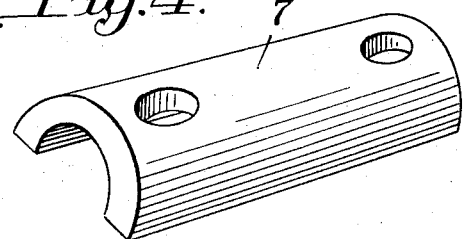
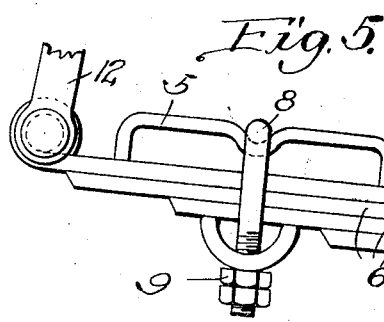
INVENTOR
William R. McGowen
By Archworth Martin,
Attorney.

Patented Dec. 31, 1929

1,741,162

UNITED STATES PATENT OFFICE

WILLIAM R. McGOWEN, OF McKEES ROCKS, PENNSYLVANIA, ASSIGNOR TO UNITED STATES CHAIN & FORGING COMPANY, OF PITTSBURGH, PENNSYLVANIA, A CORPORATION OF DELAWARE

SHOCK-ABSORBING DEVICE

Application filed September 22, 1926. Serial No. 136,978.

My invention relates to shock absorbing devices and particularly to those of the type employed for supplementing the normal resistance to frictional movement as between the leaves of a laminated spring.

My invention has for one of its objects the provision of an improved form of device or apparatus for yieldably holding the leaves of laminated springs against relative sliding movement, thereby dampening the violent flexing movements that are imparted to the springs when a large increase in pressure is suddenly applied thereto and quickly released.

Another object of my invention is to provide an improved form of shock absorbing device.

One form which my invention may take is shown in the accompanying drawing wherein Figure 1 is a side elevational view of a portion of an automobile side frame and of a semi-elliptic spring that is connected thereto; Fig. 2 is a view taken on the line II—II of Fig. 1, Fig. 3 is a perspective view, on an enlarged scale, of one of the snubbing plates of Fig. 1; Fig. 4 is a perspective view of the other snubbing plate of Fig. 1 and Fig. 5 shows a modification of the arrangement of Fig. 1.

It will be understood that the device may be applied to springs of other forms than that shown in the drawing and that, in the case of a semi-elliptic spring, I will preferably provide a snubbing device at each end thereof.

Referring to Figs. 1 to 4, my snubbing device consists of a plate 5, preferably of spring steel and of such length as to overlap one or more ends of the plates 6 that go to make up the semi-elliptic spring, substantially one-half of which is shown in the drawing. Plate 5 is disposed in a direction parallel to the spring leaves 6 and has its ends upturned so that clearance will be provided between the upper surface thereof and the adjacent surfaces of the leaves 6. Upon the top leaf a saddle or plate 7 is provided, and disposed transversely thereof, and is also preferably of spring steel. The plate 7 has holes through which the legs of a U-bolt 8 extend. Nuts 9 have screw-threaded engagement with the U-bolt 8 and, when tightened, cause the leaves 6 to be clamped between the plates 5 and 7. The plate 5 is curved at its mid portion 10, to provide a seat for the U-bolt and thus prevent relative movement of the plate 5 and the U-bolt in a direction longitudinally of the spring.

The holes in the saddle plate 7 are of somewhat greater diameter than the U-bolt so that the bolt may tilt therein, as indicated in Fig. 1, by dotted lines. When the outer end of the spring is bent downwardly, the lower leaves 6 will slide upon adjacent leaves, somewhat as indicated by dotted lines, and the plate 5 will be moved forwardly. This forward movement will not displace the saddle 7, because the yoke portion of the bolt will rock on the plate 5 and the nuts 9 and their washers will roll on the curved surface of the saddle.

Each end of the spring is connected to the side frame 11 by a shackle 12 of suitable form, in the usual manner. It will be understood that when a sudden thrust is imparted to the spring 6, either upwardly at its mid portion or downwardly at its ends, resistance will be offered, by reason of the clamping device, to sliding movement of the leaves upon one another, thus reducing the tendency of the spring to flex back and forth and quickly bringing it to a quiescent state.

The elongated form of the plate 5 increases the areas between the leaves 6 over which additional friction is applied, while the positioning of the relatively short plate 7 above the midportion of the plate 5, results in a bending force on the spring leaves, that still further increases the frictional resistance to sliding and provides a yieldable resistance that is not dependent upon the flexibility of the plates 5 and 7.

The positions of the plates 5 and 7 can be reversed, if desired, as shown in Fig. 5, in which case the ends of the plate 5 need not be turned in to so great an extent, since the curve of the upper side of the spring is the reverse to that of the lower side.

I claim as my invention:

1. A snubbing device for laminated springs, comprising an elongated plate that is disposed in parallelism with, and against one surface of, a lamination, and having its ends inturned, a saddle member disposed against the exposed face of a second lamination, and a clamping device for drawing said plate and said member toward one another to clamp the laminations between them, the said clamping device having pivotal engagement with the outer surface of the plate and the saddle member, on parallel axes.

2. A snubbing device for laminated springs, comprising a saddle member disposed against one side of the spring, the said member being curved in a direction longitudinally of the spring and having perforations, a plate disposed against the other side of said spring, a tie member engaging the last named plate to hold it in position, and passing through said perforations, and retaining means secured to the ends of said tie members and having rolling contact with the curved surface of said saddle member.

In testimony whereof I, the said WILLIAM R. McGOWEN, have hereunto set my hand.

WILLIAM R. McGOWEN.